United States Patent [19]

MacIsaac

[11] 4,442,667

[45] Apr. 17, 1984

[54] ACCELERATION LIMIT RESET

[75] Inventor: Bernard D. MacIsaac, Ottawa, Canada

[73] Assignee: Aviation Electric Ltd., Montreal, Canada

[21] Appl. No.: 224,978

[22] Filed: Jan. 14, 1981

[51] Int. Cl.³ .............................................. F02C 9/28
[52] U.S. Cl. ................................................ 60/39.281
[58] Field of Search .......................... 60/39.28 R, 243

[56] References Cited

U.S. PATENT DOCUMENTS

| | | |
|---|---|---|
| 3,006,144 | 10/1961 | Arnett et al. |
| 3,152,444 | 10/1964 | Peczkowski et al. |
| 3,393,691 | 7/1968 | Longstreet et al. |
| 3,587,229 | 6/1971 | Peczkowski |
| 3,832,846 | 9/1974 | Leeson |
| 3,888,078 | 6/1975 | Greune et al. |
| 3,928,962 | 12/1975 | Maker ............................ 60/39.28 R |
| 3,939,649 | 2/1976 | McCabe ......................... 60/39.28 R |
| 3,956,884 | 5/1976 | Eves ................................. 60/39.281 |
| 4,018,044 | 4/1977 | Joby et al. |
| 4,040,250 | 8/1977 | Saunders et al. |
| 4,045,955 | 9/1977 | Brannstrom et al. |
| 4,087,961 | 5/1978 | Avery .............................. 60/39.281 |
| 4,100,731 | 7/1978 | Janes et al. |
| 4,134,257 | 1/1979 | Riple |
| 4,171,613 | 10/1979 | Schmidt-Roedenbeck et al. |
| 4,188,781 | 2/1980 | Johnson et al. |

OTHER PUBLICATIONS

"SD Series" Controls for Aero-Engines-D. A. Caine--Nov. 1975.
Digital Control for Helicopter Power Plants-D. A. Caine & S. Janik-Nov. 1979.
NDEC-A Control Concept for Helicoptor Gas Turbines-D. J. Hawes & R. M. Evans-May 1980.

*Primary Examiner*—Louis J. Casaregola
*Attorney, Agent, or Firm*—Anthony F. Cuoco; William A. Marvin

[57] ABSTRACT

An acceleration limit reset circuit (38, 40, 42, 44) is disclosed for a closed loop fuel control (11) of a gas turbine engine (10). The closed loop control includes a comparator circuit (28) which compares an acceleration term Ngs-Nd to a limit value Al and if the scheduled acceleration (Ngs-Nd) is in excess of the limit, regulates the rate of change of the engine speed to the limited value Al. The acceleration limit Al is scheduled by an accel/decel limiter circuit (30) as substantially equivalent to the surge line of the engine. The acceleration limit reset circuit (38, 40, 42, 44) is provided for modifying the acceleration limit Al during special operating conditions of the engine (10) by a signal RRS.

8 Claims, 3 Drawing Figures

ACCELERATION LIMIT RESET

BACKGROUND OF THE INVENTION

The invention relates generally to an acceleration limit reset for fuel controls of gas turbine engines having acceleration limiters. The invention is more directly pertinent to the reset of the acceleration limit for transient conditions including a "reslam" condition.

The closed loop fuel control of gas turbine engines based on acceleration has become successfully implemented in various systems. These systems act directly to control the rate of change of the engine speed as a function of an acceleration term. The acceleration term is formed by differencing a scheduled term with an actual or an implied actual parameter of the gas generator. The actual acceleration of the engine is fed back through changes in the actual term for comparison with the scheduled term. The acceleration term, which after an integration effectively provides a datum for a proportional speed control loop, may therefore, be a function of any of a number of control input parameters including engine speed, ambient pressure, temperature, compressor pressure, etc. Advantages of this form of acceleration control include consistent predictable accelerations independent of fuel type, temperature, and altitude. The acceleration time is also generally independent of air bleed and power extraction status.

A closed loop fuel control for a gas turbine engine based on acceleration is more fully disclosed in U.S. application Ser. No. 210,938, filed in the name of Roland Marston Evans on Nov. 28, 1980, which is commonly assigned with the present application. The disclosure of Evans is hereby expressly incorporated by reference herein. Other examples of closed loop systems of this type are illustrated in U.S. Pat. Nos. 4,018,044; 4,100,731; and 4,040,250.

Because the error or acceleration term may exceed the surge capability of the engine, it is conventional in a closed loop control to limit the acceleration term according to an acceleration schedule which defines the surge line of the engine in terms of at least one engine operating parameter. Thus, if a scheduled acceleration term exceeds this limit function at a particular system operating point, the control will regulate the fuel flow accordingly and cause the engine to accelerate at the lower limit value. In many controls, the acceleration schedule is variable with respect to one or several operating parameters of the engine in order to provide an adequate stall margin while maintaining the maximum acceleration limit available over various operating conditions.

There are however, certain special transient conditions where the steady state stall margin is considerably reduced and the acceleration limit should be additionally modified or reset while these conditions exist. Since it is desirable to operate as close to the steady state surge line of the engine as possible it is not advantageous to schedule for these conditions in the normal manner. If a transient margin is included in the normal schedule, then the engine will not be able to accelerate to the full extent available in steady state conditions.

One of the most critical of these special conditions is what is termed a "reslam" operation. The condition is initiated when the engine has been in a steady state condition at a power level near maximum for a substantial period of time. The engine is very hot and therefore, fuel is very efficiently used. If, during this time, the power demand lever is retarded rapidly to idle or a reduced power position but then pushed back to a maximum level before the engine has been allowed to reach a thermal equilibrium, a reslam condition occurs. The reslam condition may produce a reduction in the stall margin of the engine whereby the overfueling capacity or surge margin may be 50% less than during a normal acceleration. It is therefore, imperative that the fuel control not excessively overfuel during this condition.

The reduction of stall margin during a "reslam" condition is due primarily to the thermal inertia of the temperature sensitive components in the engine such as air seals, compressor blades, and the like. Therefore, the stall margin is reduced at the moment of deceleration and the amount of reduction is a function of the difference in power levels. The steady state stall margin will be restored over time as the engine regains thermal equilibrium at its new operating point. If, however, an acceleration is demanded prior to the engine reaching thermal equilibrium, a reset of the acceleration limit should be implemented to prevent stall.

SUMMARY OF THE INVENTION

In accordance with its objects and advantages, the invention includes an acceleration/deceleration limiter circuit which schedules an acceleration limit for a closed loop fuel control of a gas turbine engine. The closed loop control comprises a comparator circuit which compares an acceleration term to the limit value and if the scheduled acceleration is in excess of the limit, regulates the rate of change of the engine speed to the limited value. The acceleration limit is scheduled as substantially equivalent to the surge line of the engine. An acceleration limit reset circuit is provided for modifying the acceleration limit during special operating conditions of the engine. p In the preferred embodiment, for a single or multispool spool engine, a thermal reset circuit is provided. The thermal reset circuit includes a deceleration sensor which senses the amount of a scheduled deceleration and generates a deceleration signal to a compensation circuit. The compensation circuit multiplies the deceleration signal by a gain term and generates a reslam reset signal therefrom. The reslam reset signal is then subtracted in a summing junction from the acceleration limit generated by the acceleration/deceleration limiter circuit.

In this manner the amount that the steady state acceleration limit is reset downward is proportional to the amount of the deceleration measured. Additionally, the reslam reset signal decays with a time constant related to the thermal recovery time of the engine. The control technique therefore, allows the acceleration limit to be set downward by an amount equivalent to the amount that the surge margin is reduced during a transient and then be restored at substantially the same rate as the engine recovers equilibrium.

In another embodiment the deceleration sensor includes a means for differencing the demanded speed (datum) of the system and the actual speed. For changes in the scheduled speed this method produces a delay to the sensing of a scheduled deceleration. The engine, therefore, has the opportunity to actually decelerate to the scheduled speed and produce an actual reslam condition. A false indication of surge margin reduction due to the reslam condition, where a large deceleration is scheduled but the engine actually does not decelerate to that operating point before the power demand lever requests another acceleration, is thereby avoided.

Therefore, to alleviate the above-noted stall conditions and to more advantageously control a gas turbine engine, it is the object of the invention to provide an acceleration limit reset circuit which modifies the acceleration limit of a gas turbine engine fuel control during transient conditions.

It is another object of the invention to provide a thermal acceleration limit reset until the engine has reached thermal equilibrium during "reslam" conditions.

A major advantage of this special condition reset circuit is to allow the acceleration limit schedule to operate the closed loop control closer to the steady state surge line without stall during these critical conditions.

These and other objects, features, and aspects of the invention will be more fully understood and clearly described if a reading of the detailed description is undertaken in conjunction with the appended drawings wherein:

DETAILED DESCRIPTION OF THE PREFERRED EMBODIMENTS

Figure 1:
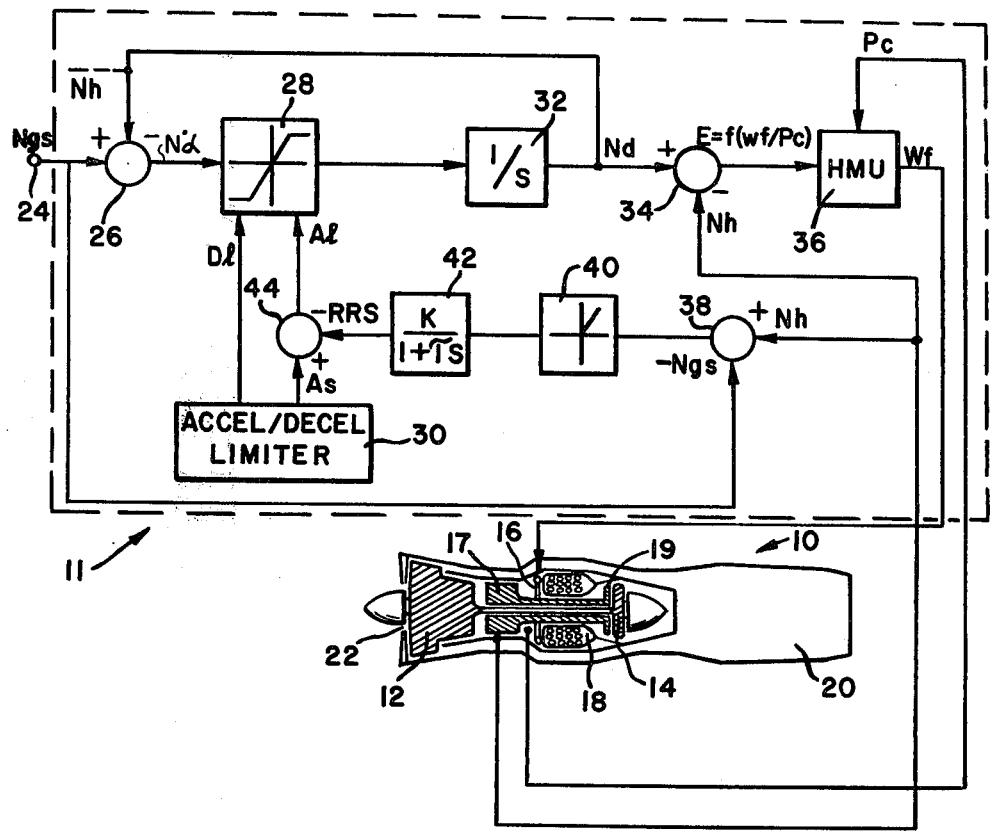
FIG. 1 is a system block diagrammatic view of a fuel control system for a gas turbine engine incorporating a thermal acceleration limit reset circuit constructed in accordance with the invention.

With reference to FIG. 1 there is shown a fuel control system 11 for a turbojet engine which is generally designated 10. The engine 10 includes an intake duct 22 through which air enters. After entering the engine, the air is compressed by a low pressure compressor 12 and subsequently by a high pressure compressor 17. Compressors 12 and 17 are of the axial type which produce an increase in pressure and consequently, an increase in the density of the incoming air as a function of their speed. The denser air moves to a fuel supply section where a fuel ring 16 produces a combustible fuel/air mixture by spraying fuel into the incoming stream. The fuel/air mixture is thereafter ignited and combusted in burners 18 to produce a high velocity exhaust gas. The exhaust gas, as is conventional in this type of reaction engine, exits through a nozzle 20 to produce a forward thrust. A portion of the energy contained in the exhaust gas is expended in rotating a low pressure turbine 14 and a high pressure turbine 19 which are physically attached to the respective compressors by concentrically disposed rotor shafts. Each compressor and turbine combination form a spool which rotates independently from the other. The engine described is a conventional two-spool turbojet engine in which the second or low pressure spool has been added to increase the efficiency of the engine.

Generally, the control of the engine speed and thus output power or thrust of the engine is regulated by the amount of fuel flowing through the fuel ring 16. This fuel flow, WF, is modulated by the fuel control 11 to provide more or less energy and thus reaction power from the engine. Increasing the fuel flow increases the engine speed and output power while decreasing the fuel flow decreases engine speed and output power.

The fuel control system 11 is provided for assuring that control of the engine speed is maintained during steady state operation, accelerations, and decelerations. The fuel control illustrated is based on an input to terminal 24 which is the desired or scheduled rotational speed Ngs, of one of the compressor and turbine combinations of the engine 10. The signal Ngs can, for example, be generated as the output from a schedule based on the power lever angle of the particular device the engine is used on. In its simplest form the Ngs signal can be generated from a potentiometer that is ganged to the power lever.

When referring to the engine speed, either the high pressure compressor speed (high spool speed Nh) or the low pressure compressor speed (low spool speed Nl) is meant because either can be used to control the engine. In this particular embodiment the controlling parameter of the fuel control will be the high spool speed Nh. The high spool speed is the controlling parameter in this type of engine since it is the more critical to the operation.

By scheduling the commanded speed Ngs to terminal 24 any desired engine power may be obtained since the fuel control varies the power of the gas turbine engine by regulating engine speed. Thus, the control system operates to govern the engine speed as a function of the scheduled speed Ngs and accelerates or decelerates the engine in a manner to reach a new scheduled speed when the pilot or another system component changes the scheduled engine speed. Otherwise, for changes in engine environment such as altitude, temperature, pressure or other factors, the governor acts to maintain the scheduled speed Ngs.

To control accelerations or decelerations, the control system forms a demanded acceleration term which is derived from the difference of the scheduled speed Ngs and a demanded speed term Nd. Alternatively, the acceleration term can be derived from the difference between the high spool speed signal Nh and the schedule speed signal Ngs. The advantages of forming the acceleration term as a function of the demanded signal are set forth in the referenced Evans application. This function is performed by feeding the two chosen parameters to a first summing junction 26 and generating a difference signal of sign and magnitude equivalent to the difference therebetween. The acceleration term or difference signal is integrated in an integrator 32 to become the demanded speed signal Nd. This portion of the control forms an integral loop providing a datum which is the demanded speed signal Nd.

The acceleration term is conventionally limited by a comparator circuit 28. The comparator 28 compares the acceleration term to an upper limit A1 and a lower limit D1 and passes the acceleration term unmodified if between the two values. However, if the demanded acceleration is great enough, the acceleration term will be limited at the upper acceleration limit A1, while if the demanded deceleration is sufficient, it will be limited at the lower deceleration limit D1. An acceleration/deceleration limiter circuit 30 is used to generate the variable limits and to modify the limits as a function of the operating parameters of the engine as is conventional in the art. An acceleration limit schedule is stored in a memory device of the circuit where the schedule is substantially equivalent to the steady state surge line of the particular engine expressed as a function of the engine operating parameters chosen. The surge line can be expressed as any of a number of different parameters indicating steady state values of fuel/air ratio.

An advantageous acceleration/deceleration limiter circuit which can be used in the illustrated gas turbine fuel control system is more fully described in a co-pending application Ser. No. 217,374, filed in the name of David J. Hawes on Dec. 17, 1980, which is commonly assigned. The disclosure of Hawes is hereby expressly included by reference herein.

Thereafter, the demanded speed signal Nd is differenced with the high spool speed of the turbine Ng in a second summing circuit 34. The error signal E generated by this difference is then used to proportionally control the fuel flow to the engine 10 in a direction tending to null the error between the scheduled speed signal Ngs and the demanded speed signal Nd. In this manner this portion of the controller forms a proportional control loop slaved to the datum Nd. For changes in the datum Nd the actual engine speed Ng will change to where there is a steady state error E supporting that particular demanded speed.

The proportional control is developed by a hydromechanical unit (HMU) 36 which receives as an input the error signal E. The HMU 36 multiplies the error signal E by a predetermined gain to provide a fuel flow Wf which is proportional to the error signal. In its simplest form, if the error signal E is electrical, the HMU could be implemented as a proportional solenoid valve which changes position with respect to a control voltage representative of the error signal to regulate fuel flow from a pressurized fuel source. The HMU 36 would, therefore, also consist of a pressure regulator and a pressurized source of fuel (not shown) as is conventionally known in the art.

Additionally, the HMU 36 can include means for mechanically multiplying the error signal E by an input representative of the output of the compressor stages, compressor pressure Pc. In combination with the proportional solenoid, the multiplying means could comprise a multiplying piston coupled to the fuel valve which tranduces the compressor pressure Pc into a force to assist the solenoid. Thus, the error signal E at all engine operating points is proportional to Wf/Pc or the fuel/air ratio of the engine. Because of this mechanical multiplication, the error signal E can be thought of as being generated as a function of the fuel/air ratio of the engine. Normally, this would make the scheduling of the speed signal Ngs much easier to implement.

The control further includes a first embodiment of an acceleration limit reset circuit comprising a summation circuit 38, a polarity detector 40, a compensation circuit 42, and a second summation circuit 44 The circuit is termed a thermal reset circuit because it modifies the acceleration limit of the engine to compensate for loss of surge margin due to thermal inertia. The acceleration limit reset circuit detects a deceleration of the engine and outputs a reslam reset signal RRS to the summation circuit 44 which is proportional to that deceleration. The reslam reset signal is subtracted from a scheduled acceleration As by the summation junction 44 to yield the final acceleration limit A1. The reslam reset signal RRS then decays with a time constant related to the thermal recovery time of the engine.

The deceleration of the engine is detected by the combination of the first summation circuit 38 and the polarity detector 40. The first summation circuit 38 subtracts the scheduled speed Ngs from the actual high spool speed signal Nh to produce an output that is fed to the polarity detector 40. The polarity detector 40 will only transmit those differences from the summation circuit from the first quadrant where the result is positive. At those times, the actual speed is greater than the scheduled speed, thereby indicating that there is a deceleration scheduled. The polarity detector may, in the simplest implementation, be a diode.

Once a deceleration has been detected, the deceleration signal is fed to the compensation circuit 42 where it is multiplied by a proportionality factor K from the numerator of the transfer function of the compensation circuit. The proportionality factor K is scaled to permit the amount of acceleration limit reset to be proportional to the amount of deceleration detected. The factor in the denominator of the transfer function, $(1+(\tau)S)$ where $(\tau)$ is a time constant and S is the Laplace operator in the frequency domain, provides a decay to the reslam reset signal RRS. The time constant $(\tau)$ is designated to be indicative of the thermal inertia of the particular engine that the control is used on.

Figure 3:
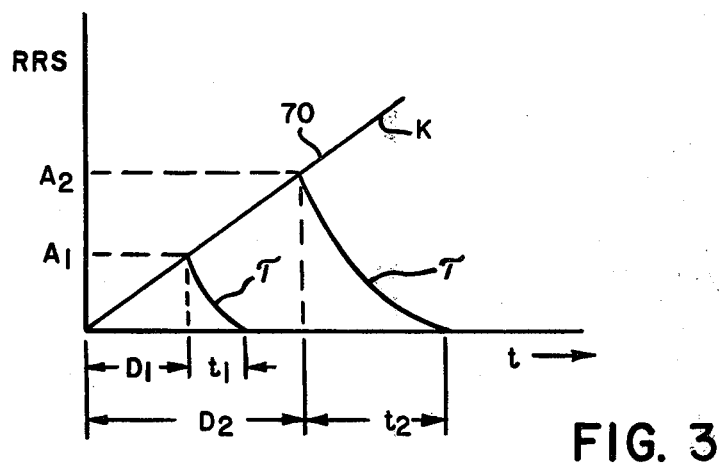
FIG. 3 is a graphic representation of the reslam reset signal amplitude as a function of time and various decelerations.

FIG. 3 is a graphical representation of the reslam reset signal RRS illustrated as a function of time and also as a function of the deceleration of the engine. The proportional generation of the signal RRS is developed by the linear straight line curve 70 with a slope equivalent to the gain K. In the illustrated embodiment, the curve 70 passes through the origin but could, if desired, be offset therefrom to not produce an acceleration limit reset until a minimum deceleration was detected.

Alternatively, the simple proportionality constant, K, could be replaced with a function of greater complexity. For example, an empirical function describing the loss of surge margin for any deceleration could be derived for a particular engine or a group of engines. Thus, curve 70 generates an RRS signal of amplitude A1 for a deceleration D1 which is equivalent to D1 multiplied by K. Similarly, a larger deceleration D2 will produce a larger RRS signal of amplitude A2 equivalent to D2(K).

Amplitudes A1, A2 of the RRS signal both decay exponentially with the same time constant $(\tau)$ but because A2 is greater than A1, the decay time T2 is greater than T1. Using the proportionality factor K in combination with a predetermined time constant allows the acceleration limit to recover in a manner similar to that of the physical thermal recovery of the engine. In other words, for greater decelerations, a longer time period is provided for the engine to regain its thermal equilibrium before it is allowed to accelerate at the steady state acceleration limit. The exponential decay of the RRS signal models the physical recovery of the thermal equilibrium by the engine relatively closely.

Figure 2:
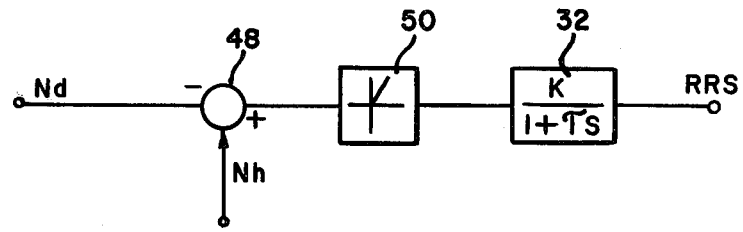
FIG. 2 is a detailed schematic block diagram of a second implementation of the thermal acceleration limit reset circuit illustrated in FIG. 1 including means for delaying a scheduled deceleration.

Another embodiment of an acceleration limit reset circuit for reslam conditions is illustrated in FIG. 2. As was previously described for the thermal reset circuit illustrated in FIG. 1, the second implementation includes a summing junction 48, a polarity detector 50, and a compensation circuit 52. These components are identical to those components described for the previous implementation and function in the same manner. However, instead of the scheduled speed signal Ngs being differenced with the high spool speed Nh to generate a deceleration signal, the demanded speed signal Nd is used for an input to summation circuit 48. This implementation will prevent a false requirement for a surge margin reduction when the power lever angle has been set to schedule a lower speed but is reslammed before the engine actually decelerates to that value. In such a case the overfueling margin has not been reduced to the extent detected and thus the acceleration limit should not be reset proportionally to the difference between the scheduled and actual speeds.

While a detailed description of the preferred embodiments and implementations has been disclosed, it will be obvious to those skilled in the art that various modifications and changes may be made thereto without departing from the spirit and scope of the invention as hereinafter defined in the appended claims. The preferred embodiment has been illustrated in connection with the operation of a turbojet engine. The invention is advantageously used with any gas turbine engine including those of the free turbine (shaft turbine) type.

What is claimed is:

1. An acceleration limit reset means for a fuel control of a gas turbine engine during thermal transient conditions including means for generating an acceleration limit, said reset means charactized by:
   means for generating a deceleration signal proportional to the deceleration of the engine;
   means, receiving said deceleration signal, for generating a reslam reset signal proportional to said deceleration signal; and
   means, receiving said reslam reset signal, for reducing the acceleration limit by an amount proportional to the reslam reset signal.

2. An acceleration limit reset means as defined in claim 1 which further includes:
   means for holding said reslam reset signal and allowing it to decay with a predetermined time constant T.

3. An acceleration limit reset means as defined in claim 2, wherein:
   said time constant T is substantially equivalent to the thermal recovery time of the engine.

4. An acceleration limit reset means as defined in claim 1 wherein said deceleration signal generating means includes:
   means for generating an actual speed signal proportional to the actual speed of the engine;
   means for generating a scheduled speed signal proportional to the scheduled speed of the engine; and
   means for differencing the scheduled and actual speed signals and for generating said deceleration signal proportional to the difference.

5. An acceleration limit reset means as defined in claim 4 which further includes:
   a polarity detector circuit for detecting a deceleration as a positive difference between said scheduled and actual speed signals; and
   wherein said differencing means subtracts the scheduled speed signal from the actual speed signal.

6. An acceleration limit reset means as defined in claim 4 wherein said deceleration signal generating means includes:
   a delay means disposed between said scheduled speed signal generating means and said differencing means for delaying the transmission of changes in the scheduled speed signal to said differencing means.

7. A fuel control for a gas turbine engine including a proportional speed loop and an integral loop, wherein said proportional speed loop tracks to a datum formed by integrating an acceleration term in the integral loop; the fuel control further including means for limiting the acceleration term to a scheduled value substantially equivalent to the steady state surge line of the engine; the fuel control characterized by an acceleration limit reset means comprising;
   means, receiving the scheduled value of the acceleration limit, for modifying the scheduled value during a reslam condition as sensed by deceleration, and for generating the acceleration limit of the fuel control as the modified scheduled value, said modifying means resetting the scheduled acceleration limit downwardly proportional to the deceleration of the engine.

8. A fuel control as defined in claim 7, wherein:
   said modifying means restores the scheduled acceleration limit after a deceleration in a manner substantially equivalent to the thermal recovery of the engine.

* * * * *